(12) United States Patent
Schachinger et al.

(10) Patent No.: US 9,273,735 B2
(45) Date of Patent: Mar. 1, 2016

(54) CLUTCH DISK

(71) Applicant: Miba Frictec GmbH, Laakirchen (AT)

(72) Inventors: Gerald Schachinger, Schoerfling (AT); Andreas Dopf, Eberstalzell (AT)

(73) Assignee: Miba Frictec GmbH, Laakirchen (AT)

( * ) Notice: Subject to any disclaimer, the term of this patent is extended or adjusted under 35 U.S.C. 154(b) by 105 days.

(21) Appl. No.: 14/043,521

(22) Filed: Oct. 1, 2013

(65) Prior Publication Data

US 2014/0124325 A1    May 8, 2014

(30) Foreign Application Priority Data

Nov. 6, 2012  (AT) .............. A 50491/2012

(51) Int. Cl.
*F16D 13/68* (2006.01)
*F16D 13/64* (2006.01)
(52) U.S. Cl.
CPC ............ *F16D 13/648* (2013.01); *F16D 13/683* (2013.01); *F16D 2250/0023* (2013.01)
(58) Field of Classification Search
CPC .................................................... F16D 13/683
See application file for complete search history.

(56) References Cited

U.S. PATENT DOCUMENTS

| | | | |
|---|---|---|---|
| 1,518,604 A | 12/1924 | Rosner | |
| 1,780,710 A | 11/1930 | Kattwinkel | |
| 3,760,921 A | 9/1973 | Gillespie | |
| 4,071,127 A * | 1/1978 | Suzuki | 192/107 R |
| 4,998,608 A | 3/1991 | Raab et al. | |
| 5,439,087 A | 8/1995 | Umezawa | |
| 7,195,111 B2 | 3/2007 | Fukushima | |
| 2002/0059713 A1* | 5/2002 | Mieda | 29/557 |
| 2006/0151275 A1 | 7/2006 | Gansloser et al. | |

FOREIGN PATENT DOCUMENTS

| | | |
|---|---|---|
| DE | 2 245 438 A | 3/1973 |
| DE | 24 59 031 A1 | 6/1976 |
| DE | 74 41 557 U1 | 1/1977 |
| DE | 39 22 730 A1 | 1/1991 |
| DE | 103 38 673 B4 | 3/2004 |
| DE | 199 58 326 B4 | 6/2009 |
| GB | 284 268 A | 9/1928 |
| GB | 1 522 825 A | 8/1978 |
| JP | H039119 A | 1/1991 |
| JP | 5-241438 A | 9/1993 |
| WO | 99/67545 A1 | 12/1999 |
| WO | 2005/012750 A1 | 2/2005 |

* cited by examiner

*Primary Examiner* — Robert Hodge
*Assistant Examiner* — Terry Chau
(74) *Attorney, Agent, or Firm* — Collard & Roe, P.C.

(57) ABSTRACT

The invention relates to a clutch disk (1) having a ring-shaped base body (2) having at least one tooth (3) protruding beyond the base body (2) radially inward or radially outward, which tooth has at least one lateral face (9) formed from a lug (8) extending in axial direction and has a first surface (12) as seen in axial direction, and a second surface (13) lying opposite the latter in axial direction, characterized in that the lug (8) is embodied to protrude beyond the first as well as the second surface (9, 11) in axial direction.

7 Claims, 3 Drawing Sheets

CLUTCH DISK

CROSS REFERENCE TO RELATED APPLICATIONS

Applicant claims priority under 35 U.S.C. §119 of Austrian Application No. A 50491/2012 filed on Nov. 6, 2012, the disclosure of which is incorporated by reference.

The invention relates to a clutch disk having a ring-shaped base body which has at least one tooth protruding the base body radially outwards or radially inwards, which tooth has at least one lateral face formed from a lug extending in axial direction and has a first surface as seen in axial direction, and a second surface lying opposite thereto in axial direction. The invention furthermore relates to a clutch, in particular a motorcycle clutch, having at least two clutch disks and a disk carrier whereon the clutch disks are arranged.

Clutch disks, as used with friction packages of clutches, are known from prior art in very different forms.

Document DE 24 59 031 A1, for example, describes clutch disks having radial toothing for being carried by a disk carrier with the teeth having a lug on a flank or on both flanks, which is bent out of the disk plane by a line delimiting the flank and the inclination of the lugs correspond to the inclination of the mating flank of the disk carrier toothing. This being the case, the lugs are bent in one direction only.

Document JP 3009119 A shows a similar embodiment of the teeth having lateral lugs as well as another known bending solution for the teeth, in which the teeth are partially bent radially inwards.

Figure 4:
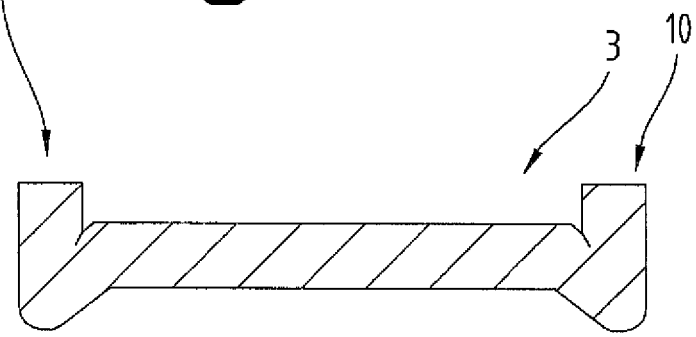

The disadvantage of these solutions is that the additionally gained area is situated unilateral with respect to the pitch line to the disk carrier. In the case of mechanical stress, the teeth can bend and the pressure can thus not be spread evenly. The maximum stress acting onto the mate face can consequently not be minimized as desired. Furthermore, a bending moment is created around the disk, with the result that (elastic) deformations of the latter can be caused, which can cause negative effects, such as e.g. clamping. If the bending is designed as shown in FIG. 4 of the mentioned JP-A, for widened attachment to the mate tooth, it is difficult to achieve a reasonable planarity of the contact surface. This requires additional processes and thus additional costs.

Document DE 2245 438 A shows a clutch disk having an essentially annular, metallic sheet metal ring having an inner and outer edge, which ring is in one part provided with at least one tooth extending in the ring plane and originating from one of these edges and the tooth has edges that are essentially arranged to be radial and spaced apart from one another in circumferential direction, by means of which its predetermined profile is delimited and the tooth has a compressed section having a greater metal thickness, which section is directly adjacent to the radially extending edges and forms a load bearing face extending transversely across the corresponding surface beyond the ring.

The disadvantage of these solutions is that a material flow process or an application is necessary. This considerably increases the complexity in terms of production and bears a large cost disadvantage hence.

Further known variants of embodiments of clutch disks or clutch sets are known from document U.S. Pat. No. 1,518,604 A, document DE 74 41 557 U1, document GB 284, 268 A, document U.S. Pat. No. 1,780,710, document U.S. Pat. No. 5,439,087 A, document DE 39 22 730 A, document DE 199 58 326 B4, document DE 103 38 673 B4 and document JP 52-41438 A.

The objective of the present invention is to propose a clutch disk having a high loading capacity.

The objective of the invention is achieved by a clutch disk of the above-mentioned kind, the lugs of which are embodied to be protruding in axial direction beyond the first as well as the second surface, or by the above-mentioned clutch, at least one of the clutch disks of which are designed according to the invention.

It is in this case of advantage that it is possible for the installation space of the clutch to be reduced due to the protruding of the lugs on both sides, so that there is more space for additional clutch disks and consequently for additional friction combinations in a predetermined installation space. It is with clutches known from prior art on the other hand possible to design an identical number of clutch disks in the clutch having greater wall thicknesses, so that the clutch disk can bear higher thermal stress. It can furthermore also be achieved that the clutch disk can be incorporated with both sides, i.e. it is not absolutely required to define a certain mounting direction.

According to a preferred embodiment variant, it can therefore be provided that the at least one tooth has two lateral faces formed from two lugs extending in axial direction, and having a distance to one another in circumferential direction both of them are designed to protrude beyond the first as well as the second surface in axial direction. It is thus possible to improve the interaction with another clutch disk, by the latter or their radially protruding coupling elements bearing against the clutch disk or being able to be coupled to the latter in a better way in the thereby formed cage-shaped interaction section. A tilting or catching of the individual clutch disks is thereby prevented in a better way.

The tooth is preferably embodied to be integral with the base body and the lugs by way of a deformation process, in particular a bending process. It is thus possible to produce the clutch disk cost-efficiently in large volumes. It is additionally possible to provide a tooth profile that can be specified exactly and does not require any further surface treatment. It is thus possible that the sheet metal the clutch disk is made from is at first bent to one side for producing the lugs and then to the opposite side, with the result that the supporting face of the tooth is in contact with the disk carrier within the pitch line of the disk carrier and can be supported by the latter, preferably centrically.

The lug(s) preferably have a wall thickness of at least 90% of the wall thickness of the remaining tooth. By way of the deformation process used for the double bending of the lugs it is thus achieved that at least the approximately double wall thickness is provided in the region of the bendings, with the result that the mechanical resistance of this region is improved, it is in particular possible to avoid a bending up in the event of mechanical stress.

This being the case, a length in axial direction of a first protrusion of the lug beyond the first surface can be approximately equal to the length in axial direction of the second protrusion of the lug beyond the second surface. The design can therefore be embodied on both sides, ideally symmetrically, and better use can be made of the entire constructional space inside the set.

The tilting of the lug(s) can be performed at least approximately at a right angle relative to the circumferential direction of the base body. On the part of the bending, an additional reinforcement and thus a higher load capacity is achieved due to the double metal sheet.

It can also be provided that the lug(s) are bent in such a way that the region(s) bent at least partly rest against one another. Due to this embodiment of the bending region, a reinforcement is achieved in this region, wherein in this region nearly the double of the wall thickness of the clutch disk or the tooth is made available.

It can furthermore be provided that the edges of the lugs have a rounding. By way of this variant of embodiment, the mating disk engaging the tooth can better be prevented from catching. It is here also of advantage that these soundings can be at least partially produced by way of the deformation process due to the flowing material, so that no or only slight after-treatments of the clutch disk are necessary.

According to one design variant of the clutch disk, it can be provided that the lugs of the clutch disk are arranged to be symmetric with respect to the pitch line of the disk carrier. It is thereby possible to noticeably reduce the evasion of the tooth in the event of mechanical stress and to effectively minimize the maximum load onto the mating surface accordingly. The bending moment is thus quasi completely "neutralized".

For a better understanding of the invention, the latter will be explained by means of the following Figures.

Figure 1:
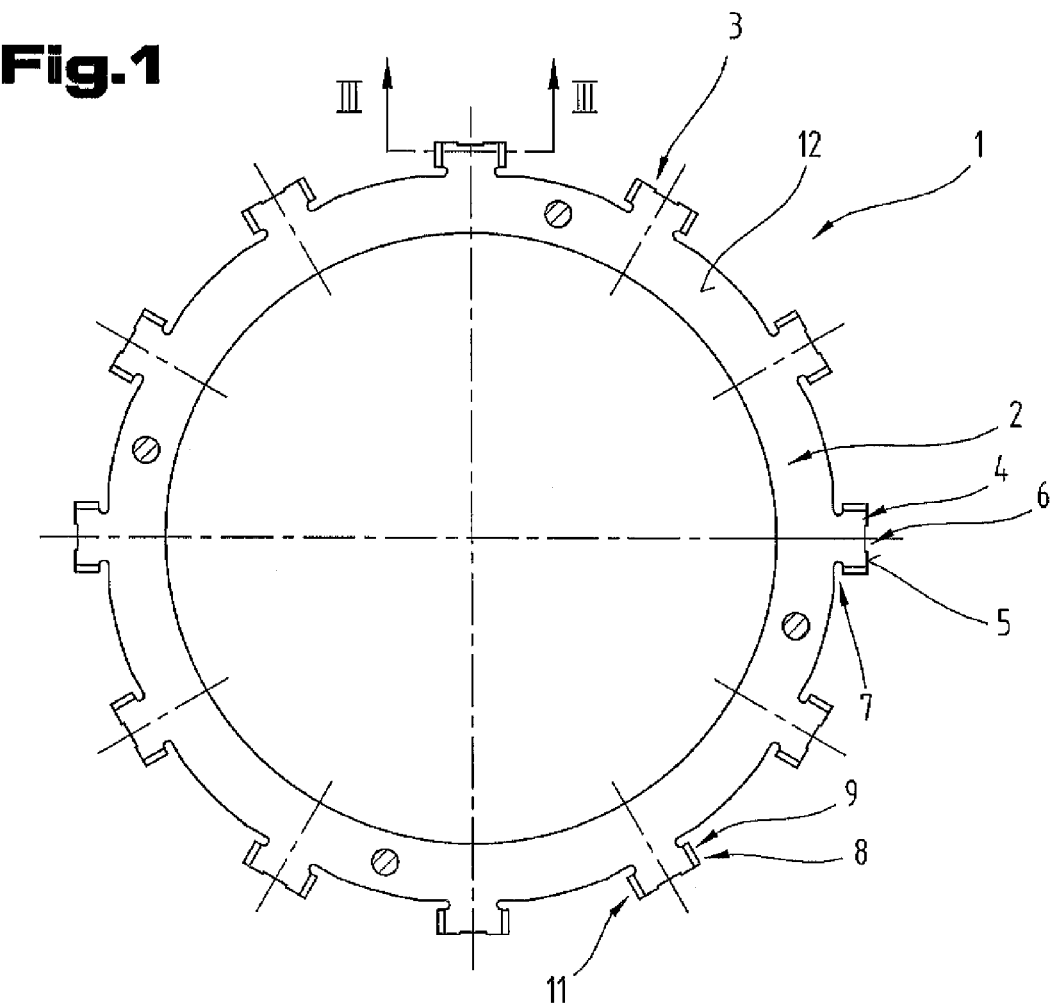
Figure 2:
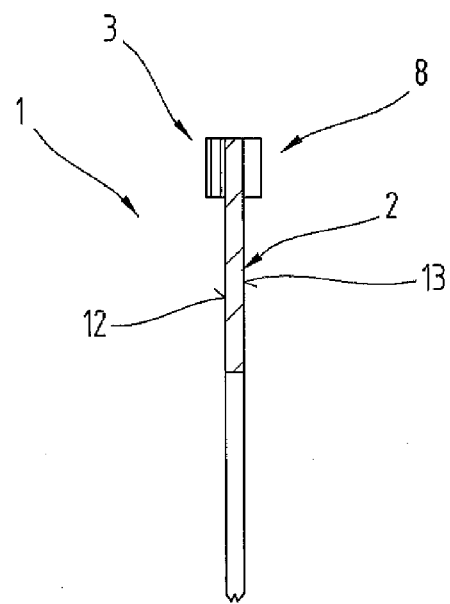
Figure 3:
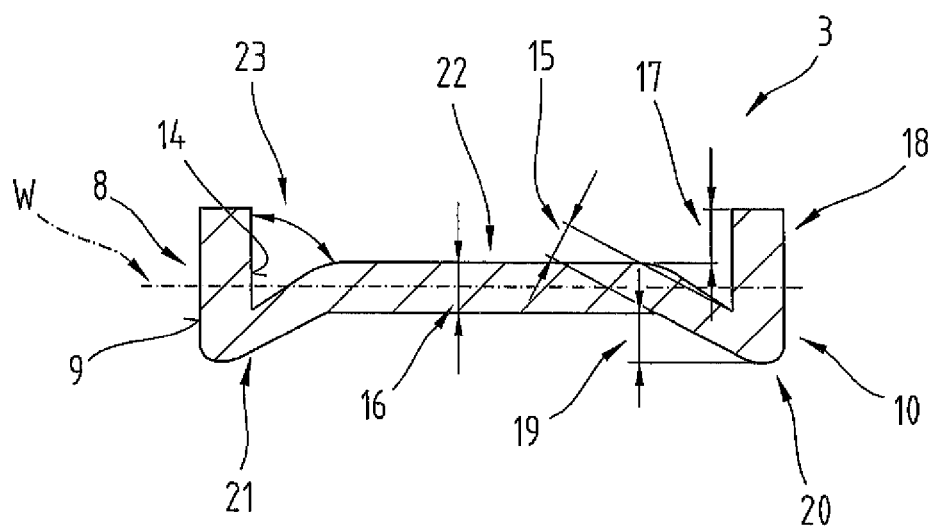
Figure 5:
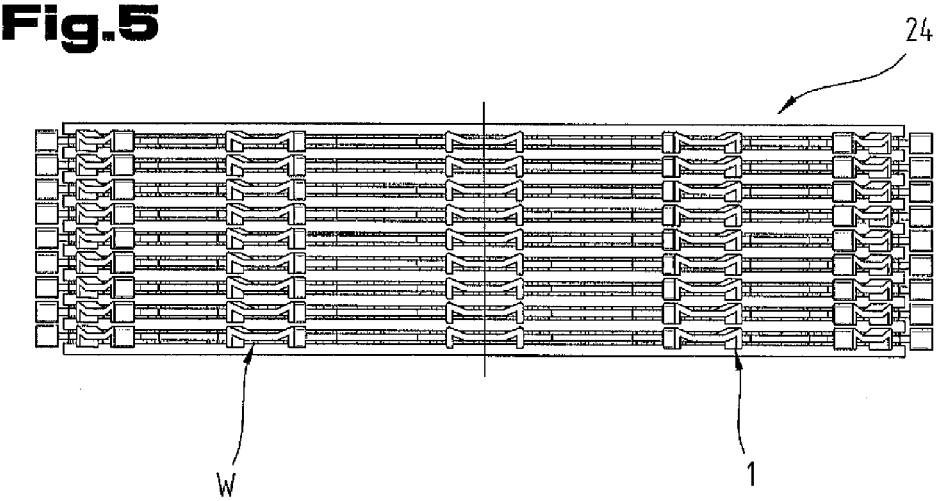
Figure 6:
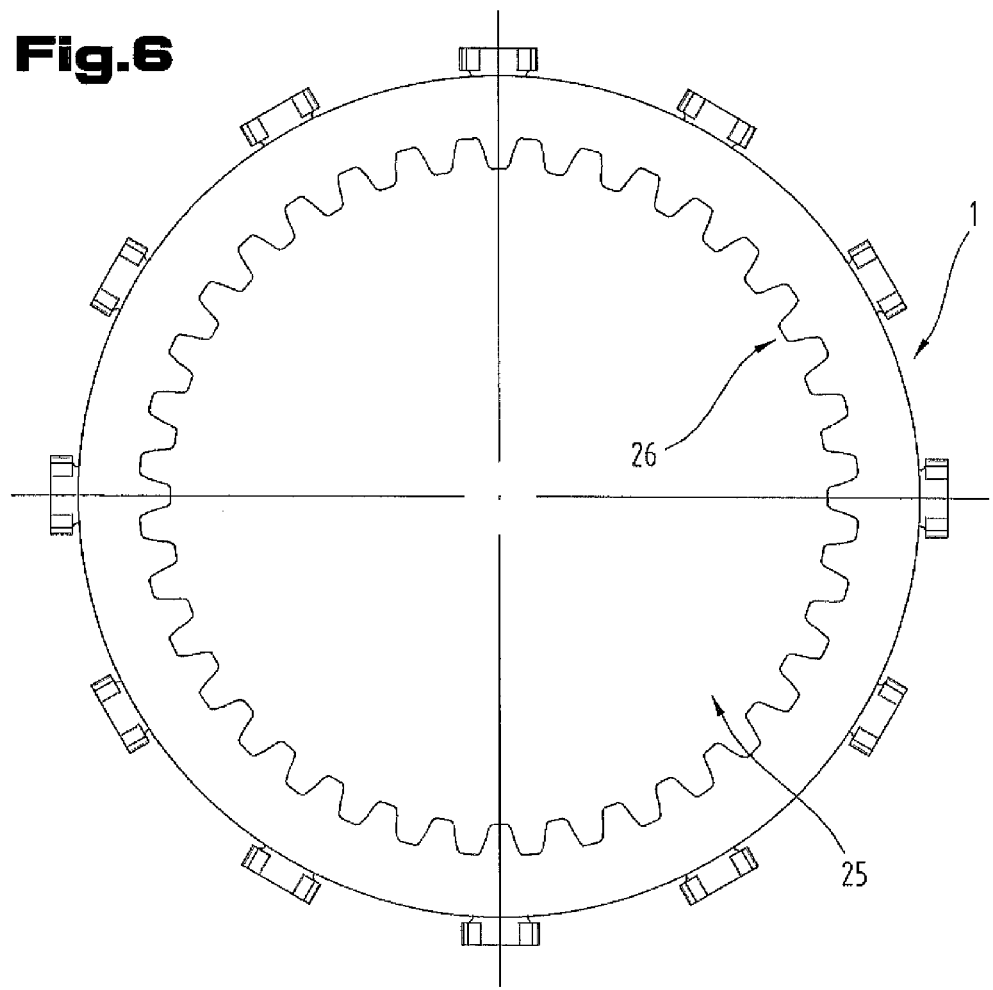

The simplified schematics show:

FIG. 1 a clutch disk in top view;

FIG. 2 a section of a clutch disk according to FIG. 1 in sectional side view;

FIG. 3 a section through a tooth of the clutch disk according to FIG. 1 according to III-III in FIG. 1;

FIG. 4 a section through a tooth of a variant of embodiment of the clutch disk;

FIG. 5 a friction package in side view;

FIG. 6 a variant of embodiment of a clutch disk in top view.

Firstly, it should be mentioned that in various embodiments described the same parts are provided with the same reference numbers and the same component names, whereby the disclosures contained throughout the entire description can be applied to the same parts with the same reference number and same component names, The indications of position used in the description, such as e.g. top, bottom, side etc. relate to the Figure being described at the time and should be transposed to new positions after a change in position.

FIGS. 1 to 3 show a first variant of embodiment of a clutch disk 1. This clutch disk 1 has a ring-shaped base body 2. Protruding beyond this base body in radial direction, at least one tooth 3 is arranged. Preferably, several teeth 3 are arranged on the base body 2 and protruding beyond the latter in radial direction. In the variant of embodiment of the clutch disk according to FIGS. 1 to 3, a total number of 12 teeth 3 is provided, but this number of teeth 3 should not be considered to be restrictive. It is also possible that more or less than twelve teeth 3 are present, e.g. two, three, four, five, six, seven, eight, nine, ten, eleven, thirteen, fourteen, etc. Preferably, a total of up to a maximum of 30 teeth 3 can be arranged on the base body 2.

The clutch disk 1 according to FIGS. 1 to 3 is embodied as a so-called external disk, i.e. the teeth 3 protrude radially outwards beyond the base body 2. It is within the scope of the invention also possible that the teeth 3 or at least one tooth 3 protrude(s) over the base body 2 in opposite direction, radially inwards. In this case, the clutch disk 1 is embodied as a so-called internal disk.

If in the following only reference is made to the embodiment of the clutch disk 1 as an external disk, this should not be considered to be restrictive, but can also be transposed to the embodiment of the clutch disk 1 as an internal disk.

It is furthermore noted that in the following, only one tooth 1 is dealt with. Unless stated otherwise, the explanations can naturally be transposed to any teeth 3.

The teeth 3 are preferably arranged at the base body 2 to be distributed symmetrically across the circumference of the base body 2 and having identical distances to one another.

At least individual teeth 3 can have a recess 6 at a tooth crest 4 in a radially outer front face 5. In the illustrated variant one tooth 3 per quadrant is provided with such a recess 6. Thereby, a connecting point to the steel strapping is provided.

As illustrated in FIG. 1, the recess 6 is preferably embodied to be rectangular having a longitudinal extension in circumferential direction of the clutch disk 1 and to be continuous in particular in axial direction.

A transition section 7 between the base body 2 and the tooth 3 is preferably provided with a rounding. It is in this case possible that the width of the tooth 3 is in circumferential direction smaller in this transition section 7 than in sections above this transition section 7 so that it is possible for the tooth 3 to have a narrowing. Due to this narrowing it is possible to avoid the formation of cracks during deformation.

The tooth 3 has a lug 8 extending at least in axial direction of the clutch disk 1, which lug forms a lateral face 9 delimiting the tooth 3 in circumferential direction. It is however preferred if a second lug 10 is disposed extending in axial direction of the clutch disk 1 and spaced apart from the first lug 8, which second lug forms a second lateral face 11 delimiting the tooth 3 in circumferential direction, so that the tooth 3 is formed to be approximately cage-shaped at least in the region of the tooth crest 4, with nevertheless this "cage" being open in an axial direction, as it is illustrated in FIG. 3. The lugs 8, 10 preferably extend in radial direction from the radially outer edge of the tooth crest 4 to the above-mentioned transition section 7. The lug or the lugs 8, 10 of the tooth 3 are embodied or arranged in such a way as to protrude beyond a first, front surface 12 of the base body 2 as well as beyond a second, rear surface 13 being embodied to be opposite the first, front surface 12 in axial direction. As seen in top view, the tooth 3 has an approximately hammer-shaped cross-section in the region of the lugs 8, 10, so that the clutch disk 1 may also be referred to as hammer head disk.

The tooth 3 or the teeth 3 is or are preferably embodied to be integral with the base body 2 and the lugs are made by way of a deformation process, in particular a bending process. It is thus possible to produce the clutch disk 1 in a cost-efficient way in serial production and to take advantage of the advantageous functional properties of a material flow process. The bending design is in this case embodied toward one side, with the result that the sheet metal is completely tilted to the opposite side, so that a supporting tooth face 14 is in contact with the disk carrier in pitch line W and is supported by the latter, ideally centrically.

The deformation, particularly the bending, is preferably performed in such a way that the wall thickness 15 of the lug 8 or the lugs 8, 10 corresponds to at least 70%, in particular to at least 90%, of a wall thickness 16 of the remaining tooth 3.

It is preferred if the clutch disk 1 is made of a steel, in particular of a low-carbon forming steel. It is nevertheless also possible to use other metallic materials, such as brass, bronze, copper, aluminium. For being produced, a blank for the clutch disk 1 can be stamped or fine stamped from a sheet metal. It is in this case of advantage if the portion of fine blanking is greater than 50%.

According to another variant of embodiment of the clutch disk 1, it can be provided that a length 17 in axial direction of a first protrusion 18 of the lug 8, 10, i.e. of the projection beyond the first surface 12—with the exception of the lug 8, 10, the tooth is preferably arranged to be aligning with the base body 2 with respect to the latter—is at least approximately the same as a length 19 in axial direction of a second protrusion 20 of the lug 8, 10 beyond the second surface 13.

As apparent from FIGS. 1 to 3, the deformation can be performed in such a way that the lug(s) 8, 10 is or are arranged to be at least approximately perpendicular with respect to the circumferential direction of the base body 2. This being the case, a transition section 21 can be formed between a middle section 22 of the tooth 3 aligning with the base body 2 and the lug or the lugs 8, 10 angular with respect to the middle section 22 of the tooth 3 and the lug or the lugs 8, 10. An angle 23 which is surrounded by this transition section 22 having the lugs 8 or 10 can be selected from a range between 45° and 80°, in particular from a range between 50° and 75°. This angle 23 can e.g. be 70°.

It is furthermore preferred if at least individual of the edges of the lug or the lugs 8, 10 have a rounding. Preferably, any edges of the lug or the lugs 8, 10 are provided with a rounding.

FIG. 4 shows a detail of a variant of embodiment of the clutch disk 1 according to FIG. 1 in the region of the tooth 3. As opposed to the variant of embodiment as shown in FIG. 3, the lug or the lugs 8, 10 in this variant of embodiment are bent in such a way that the bent region(s) at least partly rest against one another. This bears the advantage that a reinforcement of the tooth is achieved in the bent regions.

With the exception of this detail of the tooth 3, the explanations regarding the embodiment variant according to FIGS. 1 to 3 can also be transposed to the clutch disk 1 in embodiment variant according to FIG. 4.

The clutch disk 1 is used in a usual clutch, i.e. in the friction package of such a clutch. The clutch disk 1 is particularly used in a motorcycle clutch.

Such clutches comprise at least two clutch disks, and in the clutch according to the invention, an above-described clutch disk 1 is used. The clutch disks are in this case arranged on a disk carrier.

Since such clutches, in particular friction packages per se, are known from prior art, e.g. from the above-mentioned printed matters, no details will be provided in this respect. To this end, it is referred to relevant prior art. For the sake of completeness, FIG. 5 shows such a disk set 24 having nine clutch disks 1. It is however noted that the number of clutch disks 1 can be any other than nine. This number is rather subject to the particular usage. It is e.g. possible to arrange two, three, four, five, six, seven, eight, ten, eleven, twelve, etc. clutch disks 1 in such a disk set 24.

According to a preferred embodiment variant of the clutch it is provided that the lugs 8, 10 of the clutch disk 1 are arranged to be symmetric with respect to the pitch line of the disk carrier, as it may be taken from FIGS. 3 and 5.

FIG. 6 illustrates a variant of embodiment of the clutch disk 1. This Fig. is to stress that the clutch disk 1 can also have a different geometry, can in particular have a toothing 26 in the region of an inner recess 25.

The exemplary embodiments show possible variants of embodiment of the clutch disk 1.

For the sake of good order it should finally be pointed out that, in order to provide a clearer understanding of the structure of the clutch disk 1 it and its constituent parts are illustrated to a certain extent out of scale and/or on an enlarged scale and/or on a reduced scale.

LIST OF REFERENCE NUMERALS

1 Clutch disk
2 Base body
3 Tooth
4 Tooth crest
5 Front face
6 Recess
7 Transition section
8 Lug
9 Lateral face
10 Lug
11 Lateral face
12 Surface
13 Surface
14 Tooth face
15 Wall thickness
16 Wall thickness
17 Length
18 Protrusion
19 Length
20 Protrusion
21 Transition section
22 Middle section
23 Angle
24 Disk set
25 Recess
26 Toothing
W Pitch line

The invention claimed is:

1. A clutch disk having a ring-shaped base body having at least one tooth protruding beyond the base body radially inward or radially outward,
   wherein the at least one tooth consists of a middle section, first and second transition sections, and first and second lugs, wherein first and second lateral faces are formed from the first and second lugs and extend in an axial direction and have a distance from one another in a circumferential direction,
   wherein the at least one tooth is formed to be integral with the base body and the first and second lugs by a deformation process,
   wherein the base body has a first surface as seen in the axial direction, and a second surface lying opposite the first surface in the axial direction,
   wherein the first and second transition sections and the first and second lugs are formed by double bending such that there are only two bending lines between the middle section and each lug and wherein the first and second lugs have first and second front faces, respectively, arranged at least approximately at a right angle to the axial direction,
   wherein the middle section aligns with the base body and the first and second transition sections are angular with respect to the middle section as a whole and connect the middle section with the first and second lugs, respectively,
   wherein the first and second lugs are arranged to be at least approximately at a right angle with respect to the middle section as a whole and with respect to the circumferential direction of the base body and protrude beyond the first surface as well as the second surface in the axial direction, and
   wherein an angle between the transition sections and the lugs is selected from a range between 45° and 80°.

2. The clutch disk according to claim 1, wherein a wall thickness of the lugs corresponds to at least 90% of the wall thickness of the remaining tooth.

3. The clutch disk according to claim 1, wherein a length in the axial direction of a first protrusion of the lugs beyond the first surface is at least approximately the same as a length in the axial direction of a second protrusion of the lugs beyond the second surface.

4. The clutch disk according to claim 1, wherein the first and second lugs are bent in such a way that the bent regions at least partly rest against one another.

5. The clutch disk according to claim 1, wherein the edges of the lugs are at least partly provided with a rounding.

6. A clutch having at least first and second clutch disks and a disk carrier whereon the clutch disks are arranged, wherein at least the first clutch disk is designed according to claim 1.

7. The clutch according to claim 6, wherein the disk carrier has a pitch line and the lugs of the first clutch disk are arranged to be symmetric with respect to the pitch line of the disk carrier.

\* \* \* \* \*